(12) United States Patent
Benkreira et al.

(10) Patent No.: US 12,299,730 B2
(45) Date of Patent: May 13, 2025

(54) SYSTEM, METHOD AND COMPUTER-ACCESSIBLE MEDIUM FOR REPEATING PRIOR PURCHASES

(71) Applicant: Capital One Services, LLC, McLean, VA (US)

(72) Inventors: Abdelkader Benkreira, Philadelphia, PA (US); Joshua Edwards, Washington, DC (US); Michael Mossoba, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 258 days.

(21) Appl. No.: 16/837,120

(22) Filed: Apr. 1, 2020

(65) Prior Publication Data

US 2021/0312528 A1    Oct. 7, 2021

(51) Int. Cl.
| | |
|---|---|
| G06Q 30/00 | (2023.01) |
| G06Q 20/12 | (2012.01) |
| G06Q 20/34 | (2012.01) |
| G06Q 30/0601 | (2023.01) |

(52) U.S. Cl.
CPC ......... *G06Q 30/0635* (2013.01); *G06Q 20/12* (2013.01); *G06Q 20/34* (2013.01)

(58) Field of Classification Search
CPC ..... G06Q 30/0635; G06Q 20/12; G06Q 20/34
USPC ...................................................... 705/26.81
See application file for complete search history.

(56) References Cited

U.S. PATENT DOCUMENTS

| | | | |
|---|---|---|---|
| 7,039,605 B2 | 5/2006 | Kuwahara et al. | |
| 7,082,412 B1 | 7/2006 | Treider et al. | |
| 7,516,883 B2 | 4/2009 | Hardesty et al. | |
| 7,822,679 B1 | 10/2010 | Vaux et al. | |
| 8,442,884 B2 | 5/2013 | Haberstroh | |
| 8,751,319 B2* | 6/2014 | Silverstein | G06Q 30/0633 705/26.1 |
| 9,202,211 B2* | 12/2015 | Davis | G06Q 20/3255 |
| 9,286,637 B1* | 3/2016 | Keld | G06Q 40/02 |
| 9,501,800 B2* | 11/2016 | Olliphant | G06Q 40/10 |
| 10,296,964 B1* | 5/2019 | Rausch | G06Q 30/0635 |

(Continued)

OTHER PUBLICATIONS

Amazon: Archive.org Wayback Machine: www.amazon.com; Dec. 17, 2006, 6pgs. (Year: 2006).*

(Continued)

*Primary Examiner* — Robert M Pond
(74) *Attorney, Agent, or Firm* — HUNTON ANDREWS KURTH LLP

(57) ABSTRACT

An exemplary system, method an computer-accessible medium can include generating a list of transactions with a plurality of merchants using a financial account associated with a financial account provider, determining a plurality of items in the list of transactions that are available for repurchase, displaying the transaction and the items available for repurchase, receiving a purchase request to repurchase at least one of the items available for repurchase from at least one of the merchants, and initiating a repurchase of the at least one of the items by the financial account provider with the at least one of the merchants. The financial account can be a credit card account. The items in the list of transactions that are available for repurchase can be determined by determining item level data for each transaction in the list of transactions.

15 Claims, 8 Drawing Sheets

(56) References Cited

U.S. PATENT DOCUMENTS

| | | |
|---|---|---|
| 2001/0037260 A1 | 11/2001 | Kim |
| 2002/0032650 A1 | 3/2002 | Hauser et al. |
| 2002/0120587 A1* | 8/2002 | D'Agostino ......... G06Q 20/105 |
| | | 705/78 |
| 2003/0023552 A1 | 1/2003 | Kight et al. |
| 2004/0019559 A1 | 1/2004 | Moenickheim et al. |
| 2004/0034583 A1 | 2/2004 | Lanier et al. |
| 2004/0068441 A1* | 4/2004 | Werbitt ............ G06Q 30/0281 |
| | | 705/16 |
| 2004/0210476 A1 | 10/2004 | Blair et al. |
| 2005/0091132 A1 | 4/2005 | Phillips et al. |
| 2006/0143121 A1 | 6/2006 | Treider et al. |
| 2007/0043663 A1 | 2/2007 | Simpson |
| 2009/0089113 A1* | 4/2009 | Rousso ............. G06Q 30/0601 |
| | | 705/26.1 |
| 2012/0150677 A1* | 6/2012 | Shuster ............. G06Q 10/087 |
| | | 705/26.1 |
| 2012/0290471 A1 | 11/2012 | Hoke |
| 2012/0290479 A1 | 11/2012 | Hoke et al. |
| 2013/0218776 A1 | 8/2013 | Monaghan et al. |
| 2013/0262269 A1 | 10/2013 | O'Leary |
| 2013/0339238 A1 | 12/2013 | Unland et al. |
| 2014/0188717 A1 | 7/2014 | Gillman |
| 2014/0279310 A1 | 9/2014 | Fossella et al. |
| 2014/0279451 A1 | 9/2014 | Saadat et al. |
| 2014/0337175 A1* | 11/2014 | Katzin ................ G06Q 20/326 |
| | | 705/26.62 |
| 2015/0066765 A1 | 3/2015 | Banks et al. |
| 2015/0178693 A1 | 6/2015 | Solis |
| 2016/0253639 A1 | 9/2016 | Sharma |
| 2017/0262926 A1* | 9/2017 | High .................. G06K 7/10712 |
| 2018/0197177 A1* | 7/2018 | Lee .................... G06Q 30/0641 |
| 2019/0108601 A1* | 4/2019 | Ke ..................... G06Q 30/0635 |
| 2019/0230080 A1* | 7/2019 | Boothby ............. G06Q 20/4016 |
| 2019/0355034 A1* | 11/2019 | Moring ................ G06Q 20/326 |
| 2020/0327589 A1* | 10/2020 | Greenberg ............. G06Q 20/36 |

OTHER PUBLICATIONS

"EBay Tips Personalization Features," Lee, Adriana. WWD: 22. Penske Business Corporation. (Jun. 21, 2019); Dialog #2319715333, 3pgs, (Year: 2019).*

* cited by examiner

| Merchant 105 | Item(s) 110 | Transaction Amount 115 | Date 120 |
|---|---|---|---|
| Store 1 | Item 1 [Purchase] — 305 | Amount 1 | Date 1 |
| Store 2 | Item 2 | Amount 2 | Date 2 |
| Store 3 | Item 3 | Amount 3 | Date 3 |
| Store 4 | Item 4 [Purchase] — 320 | Amount 4 | Date 4 |

Figure 5

SYSTEM, METHOD AND COMPUTER-ACCESSIBLE MEDIUM FOR REPEATING PRIOR PURCHASES

FIELD OF THE DISCLOSURE

The present disclosure relates generally to purchases, and more specifically, to exemplary embodiments of an exemplary system, method and computer-accessible medium for repeating prior purchases.

BACKGROUND INFORMATION

Online shopping is a form of electronic commerce which allows consumers to directly buy goods or services from a seller over the Internet using a web browser (e.g., on a computer, a tablet, a mobile phone, or any mobile device), or through dedicated applications for making purchases. Consumers find a product of interest by visiting the website, or application, of the retailer directly or by searching among alternative vendors using a shopping search engine, which displays the same product's availability and pricing at different e-retailers. Typically, a consumer will shop at multiple online retailers, often choosing the best price for the good. Shopping at multiple retailers can save consumers a significant amount of money. However, this can make repeat purchases of the same item more time consuming as the user will have to determine where they ordered the item, access the retailer's website again, and go through the entire purchase process again.

Thus, it may be beneficial to provide an exemplary system, method and computer-accessible medium for repeating prior purchases which can overcome at least some of the deficiencies described herein above.

SUMMARY OF EXEMPLARY EMBODIMENTS

An exemplary system, method an computer-accessible medium can include generating a list of transactions with a plurality of merchants using a financial account associated with a financial account provider, determining a plurality of items in the list of transactions that are available for repurchase, displaying the transaction and the items available for repurchase, receiving a purchase request to repurchase at least one of the items available for repurchase from at least one of the merchants, and initiating a repurchase of the at least one of the items by the financial account provider with the at least one of the merchants. The financial account can be a credit card account. The items in the list of transactions that are available for repurchase can be determined by determining item level data for each transaction in the list of transactions.

In certain exemplary embodiments of the present disclosure, the repurchase can be initiated by determining the at least one of the merchant associated with the at least one of the items; and sending to the at least one of the merchants (i) payment information to pay for the at least one of the items, (ii) purchase information for the at least one of the items, and (iii) address information for a customer associated with the financial account. The payment information can exclude credit card information. The repurchase of the at least one of the items can be a recurring purchase. The repurchase can be denied based on a dollar amount of the at least one of the items. The repurchase can be denied based on an item category of the at least one of the items.

In some exemplary embodiments of the present disclosure, the item category can include (i) computers, (ii) electronics, (iii) jewelry, or (iv) appliances. The repurchase can be denied based on a machine learning model. The purchase request can be validated prior to initiating the repurchase.

An exemplary system can include a computer hardware arrangement configured to generate a list of transactions with a plurality of merchants using a financial account associated with a financial account provider, and determine a plurality of purchased items associated with the transactions. A user interface can be configured to display the list of the transactions with the plurality of merchants and the plurality of purchased items, where at least one of the purchased items can be selectable to initiate a repurchase of the at least one of the purchased items. The financial account can be a credit card account. The purchased items can be determined by determining item level data for each transaction.

In certain exemplary embodiments of the present disclosure, the repurchase of the at least one of the purchased items can be initiated by determining a particular one of the merchants associated with the at least one of the purchased items, and sending to the particular one of the merchants (i) payment information to pay for the at least one of the purchased items, (ii) purchase information for the at least one of the purchased items, and (iii) address information for a customer associated with the financial account. The payment information can exclude credit card information. The repurchase of the at least one of the purchased items is can be recurring purchase. A purchase request can be validated prior to initiating the repurchase. A repurchase request can be denied based on at least one of (i) a dollar amount of the at least one of the purchased items, (ii) an item category of the at least one of the purchased items, (iii) a machine learning model.

Additionally, an exemplary system, method and computer-accessible medium can include, generating a list of transactions with a plurality of merchants using a financial account associated with a financial account provide, determining item level data for each of the transactions, determining a plurality of items in the list of transactions that are available for repurchase, displaying the transactions and the item level data, receiving a repurchase request to repurchase at least one of the items available for repurchase from at least one of the merchants associated with the item level data, sending a verification to a person associated with the financial account to verify the repurchase request, and initiating a repurchase of the at least one of the items by the financial account provider with the at least one of the merchants.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIG. 5 is an exemplary diagram of a transaction history generated by a financial institution providing the ability to repurchase only some of the items in the transaction history according to an exemplary embodiment of the present disclosure;

DETAILED DESCRIPTION OF EXEMPLARY EMBODIMENTS

A credit card or charge card is a payment card issued to users (e.g., cardholders) to enable the cardholder to pay a merchant for goods and services based on the cardholder's promise to the card issuer to pay them for the purchase amounts, plus the other agreed charges. The card issuer, usually a bank, creates a revolving account, and grants a line of credit to the cardholder, from which the cardholder can borrow money for payment to a merchant or as a cash advance. Purchases are generally grouped by a transaction period, which is generally approximately a 30-day period. At the end of the purchase period the user is provided with a physical or electronic statement of all transactions made in the previous transaction period.

Figure 1:
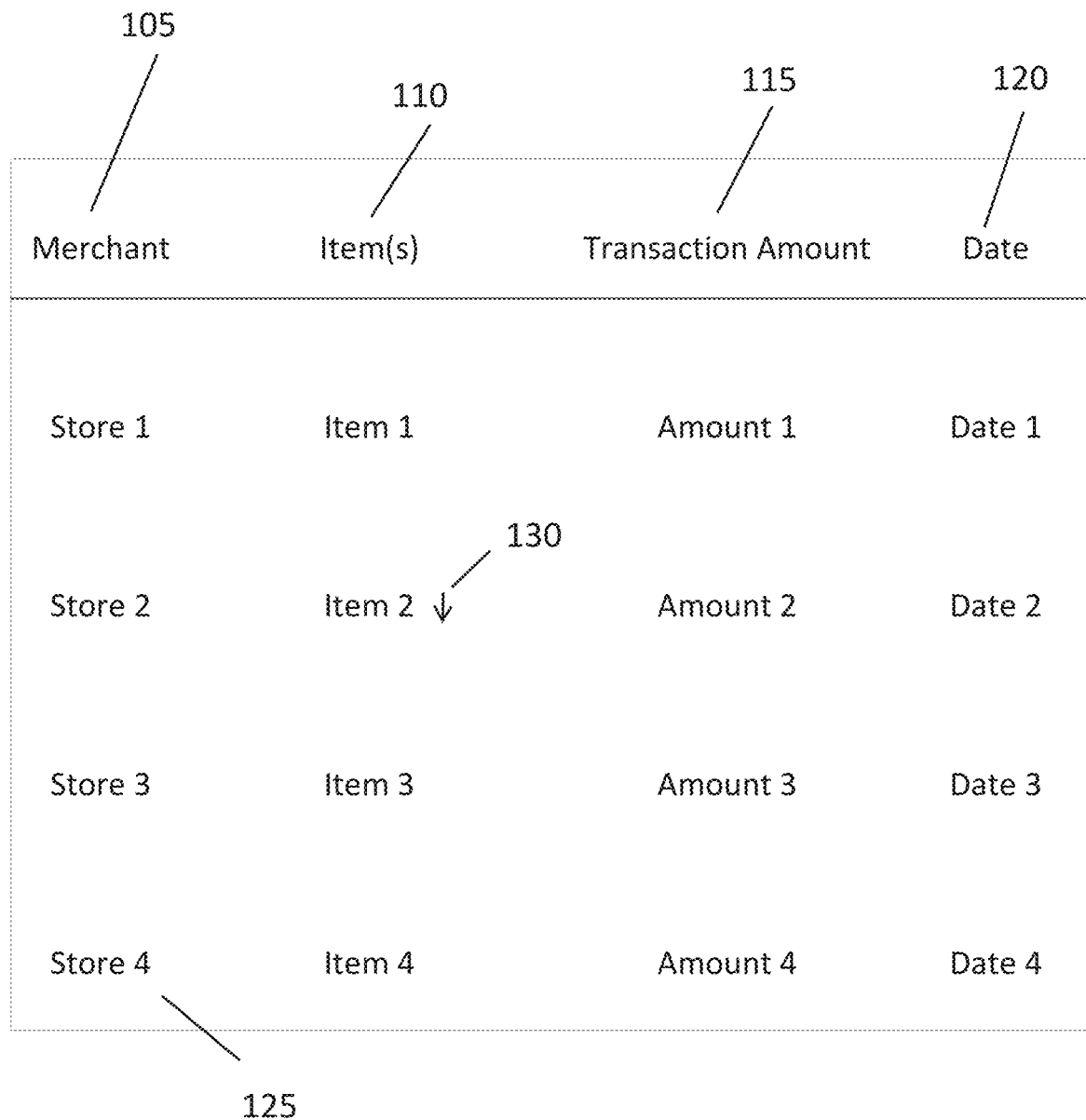
FIG. 1 is an exemplary diagram of a transaction history generated by a financial institution according to an exemplary embodiment of the present disclosure.

FIG. 1 is an exemplary diagram of a transaction history generated by a financial institution according to an exemplary embodiment of the present disclosure. For example, the transaction history shown in FIG. 1 can be generated by the financial institution associated with the credit card used to make all of the transactions listed. Transactions can include in person transactions, online transactions, phone transactions, etc. Additionally the transactions can include any credit card transaction regardless of where the transaction occurred. Thus, the transaction history can be platform agnostic, and is not limited to a particular platform (e.g., is not limited to a single marketplace setup by a single company).

The transaction history shown in FIG. 1 can include various types of identifying information to be viewed by the consumer. For example, the transaction history can have a list transaction 125, and each transaction can have a Merchant 105, a list of Item(s) 110 associated with Merchant 105, a Transaction Amount 115 for each Item 110, and a Date 120 corresponding to the purchase date of each item. Each store (e.g., Stores 1-4) can correspond to a different transaction made by the consumer. If the transaction was for only a single item, Item(s) 110 can display the single item, and Transaction Amount 115 can be the transaction amount for the single item. However, in many cases, a transaction will include multiple items purchased at the same time from the same merchant. In such a case, Item(s) 110 can include an indication (e.g., arrow 130) that there are multiple items in the item list. Item(s) 110 can display the first item in the transaction list for that transaction, or Item(s) 110 can have some text indicating that there are multiple transaction (e.g., "multiple", "Display All", etc.). Transaction Amount 115 can then include the entire transaction amount for all items in the transaction. If the user wants to view all of the items for the specific transaction, the user can then click on the transaction 125 (e.g., click on the transaction for Store 2) to display all of the items.

Figure 2:
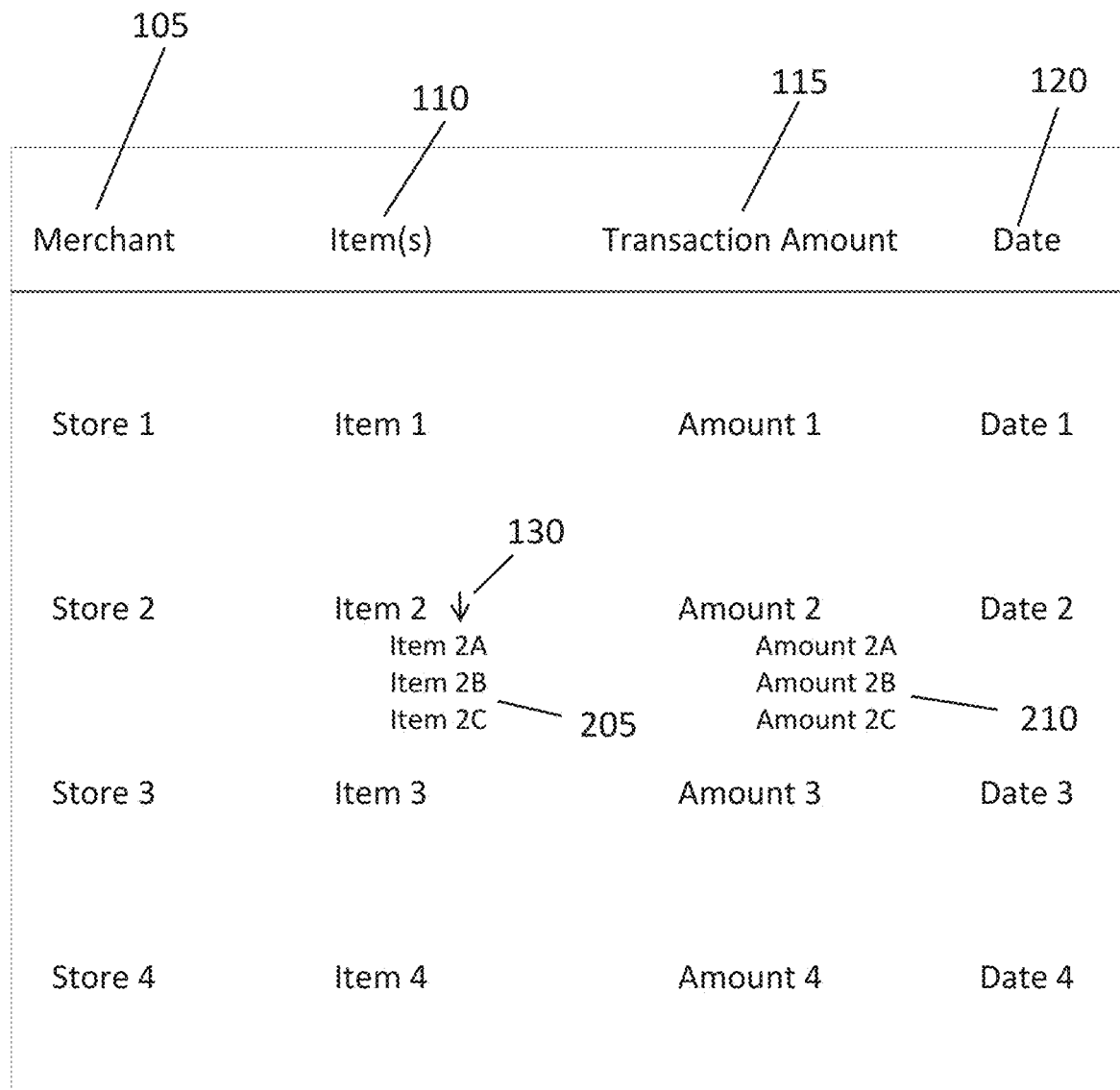
FIG. 2 is an exemplary diagram of a transaction history generated by a financial institution providing a list of individual items for a transaction according to an exemplary embodiment of the present disclosure.

FIG. 2 is an exemplary diagram of a transaction history generated by a financial institution providing a list of individual items for a transaction according to an exemplary embodiment of the present disclosure. As shown in FIG. 2, when a consumer selects the transaction to display all of the items, the transaction can expand to show a list of items 205 associated with a specific transaction. Amount 115 will also expand to display the specific amount 210 for each item. Item level data for each transaction can be provided directly by the merchant associated with the transaction. Thus, instead of the merchant just sending the amount to be charged, the merchant can also send a list of each item (e.g., including a description), and the amount paid for each item. Alternatively, a user can select a transaction from the transaction list, and the exemplary system, method and computer-accessible medium can automatically request the information from the merchant and then update the transaction list with each item in the transaction. For example, the merchant can send various characteristics regarding each item, which can include the name, a description, the brand, etc.

Users can also manually enter the items in each transaction, and the amount associated with each item, or users can upload a copy of the receipt, and the items purchased, and the amount per item, can be determined by electronically analyzing the receipt to differentiate each item and its associated amount. Users can upload a copy of their receipt by scanning their receipt, and uploading the scan. Alternatively, users can capture the receipt using a camera (e.g., on a phone or a tablet), and the image can be uploaded for automatic analysis to determine each item and its associated amount. Additionally, monitoring software can be installed (e.g., a background application or a browser extension), which can be used to monitor transactions initiated by the user in order to populate the transaction information (e.g., the items in the transaction and the amount associated with each item), which can include monitoring online shopping carts used by the user. Additionally, merchant specific transactions can be retrieved from one or more email addresses associated with the user, as described below.

The exemplary system, method and computer-accessible medium can scan the user's email account looking for various transactions made by the user, as well as the credit card used to make the transaction. A list of transactions, and the specific credit card, can be generated, and the specific transactions associated with a specific credit card can be automatically or manually uploaded into the transaction history (e.g., the information can be scraped from the user's email account and uploaded).

The exemplary system, method and computer-accessible medium can access the user's email account and rewards account using the user's login credentials for the particular account. For example, an Application Program Interface ("API") can be made to the email account. An API is an interface or communication protocol between different parts of a computer program intended to simplify the implementation and maintenance of software. An API may be for a web-based system, operating system, database system, computer hardware, or software library. An API specification can take many forms, but often includes specifications for routines, data structures, object classes, variables, or remote calls.

Web APIs are the defined interfaces through which interactions happen between an enterprise and applications that use its assets, which also is a Service Level Agreement ("SLA") to specify the functional provider and expose the service path or URL for its API users. An API approach is an architectural approach that revolves around providing a program interface to a set of services to different applications serving different types of users.

When used in the context of web development, an API is typically defined as a set of specifications, such as Hypertext Transfer Protocol ("HTTP") request messages, along with a definition of the structure of response messages, usually in an Extensible Markup Language ("XML") or JavaScript Object Notation ("JSON") format.

In addition to sending the item level data, the merchant can also provide some identifying information associated with a user account for the transaction. For example, when a user signs up for an account with the merchant, the merchant can have certain identifying information about the user, and the user may be assigned a unique identification. When the merchant sends the transaction information, which is included in the transaction history, the merchant can also provide the unique identification. Thus, when a repurchase is made, the exemplary system, method and computer-accessible medium may only need to provide the unique identification to the merchant, which the merchant can then use to identify the consumer.

Many states or jurisdiction charge a sales tax on one or more items depending on the laws of the particular jurisdiction. When a transaction expands to show all items 205, the specific transaction amounts 210 may not include the tax associated with the item. Thus, Transaction Amount 115, which is the total for the transaction, may be larger than if one were to add amounts 210 for each item 205. However, it can be possible for the exemplary system, method and computer-accessible medium to calculate the tax for each item, and thus amounts 210 can include the tax for that item.

Figure 3:
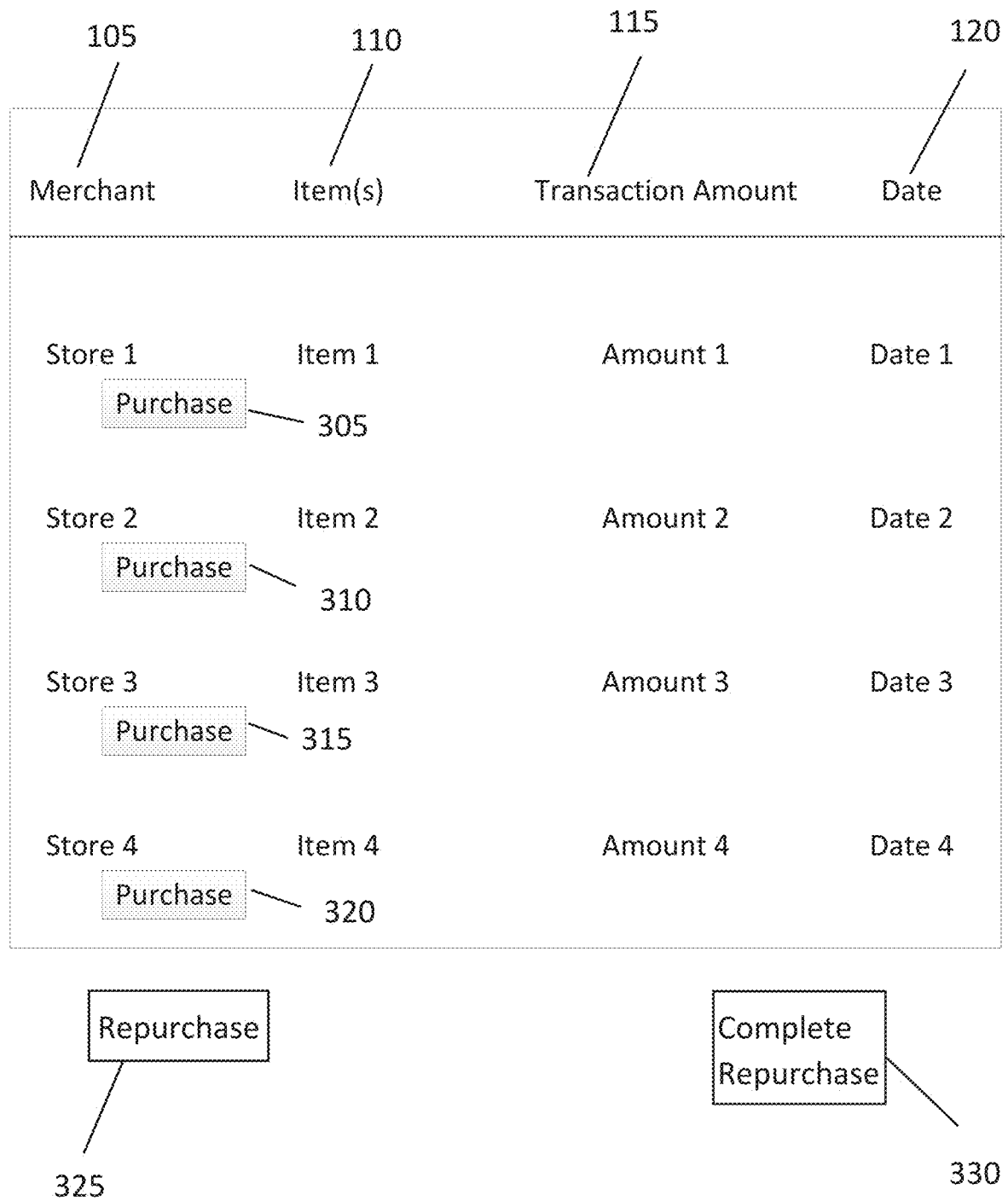
FIG. 3 is an exemplary diagram of a transaction history generated by a financial institution providing the ability to repurchase all items in the transaction history according to an exemplary embodiment of the present disclosure.

In previous systems, in order to repurchase an item(s), the consumer would have to identify where the item was purchased, access the retailer's website, and reorder the item, including entering in their identifying information and a credit card number to pay for the item(s). In contrast, the exemplary system, method and computer-accessible medium facilitates a user to repurchase an item directly from the transaction history associated with a transaction card account issued by a financial institution. FIG. 3 is an exemplary diagram of a transaction history generated by a financial institution providing the ability to repurchase one or more items in the transaction history according to an exemplary embodiment of the present disclosure. As shown in FIG. 3, a user can select a button 325, which will then display multiple Purchase Buttons 305-320 next to each transaction. In order to repurchase an item, the consumer simply selects the corresponding Purchase Button 305-320 for the corresponding transaction. The exemplary system, method and computer-accessible medium, according to an exemplary embodiment of the present disclosure, can then initiate the repurchasing of the item, which can include electronically interfacing directly with the retailer associated with the transaction, providing them with the purchase information and providing them with a payment.

Each Item(s) 110 can have an immediate repurchase request once the corresponding Purchase Button 305-320 has been selected by the consumer. Alternatively, the consumer can select each Purchase Button 305-320 that the consumer wishes to repurchase, and the Purchase Button 305-320 can be highlighted, but no purchase can be made. Once the consumer has selected all Item(s) 110 to be repurchased (e.g., by selecting the corresponding Purchase Button), the consumer can initiate the repurchase of all of the items by selecting the Complete Repurchase Button 330. This can provide a second confirmation layer such that an accidental selection of one of the purchase Buttons 305-320 will not result in an immediate repurchase. After Repurchase Button 330 is selected, the exemplary system, method and computer-accessible medium will then initiate a repurchase of Item(s) 110 with each merchant associated with each selected Item(s) 110.

As shown in FIG. 3, a user selects repurchase button 325 in order to be provided with access to repurchase items in the transaction history. However, a repurchase button 325 is not needed, and the transaction history (e.g., as shown in FIG. 1) can have purchase buttons 305-320 already displayed next to each transaction. If there are multiple items in a specific transaction, the consumer can initiate a repurchase of all of the items by simply selecting one of Purchase Buttons 305-320 where the specific transaction has multiple items associated therewith.

The payment for the repurchase can be based on the same payment mechanism (e.g., credit card) used to make the initial purchase. However, as discussed below, another form of payment can be used (e.g., direct electronic funds transfer) that can be outside of the typical credit card transaction mechanism, and which can avoid many of the pitfalls associated with such a payment mechanism (e.g., transaction fees).

Figure 4:
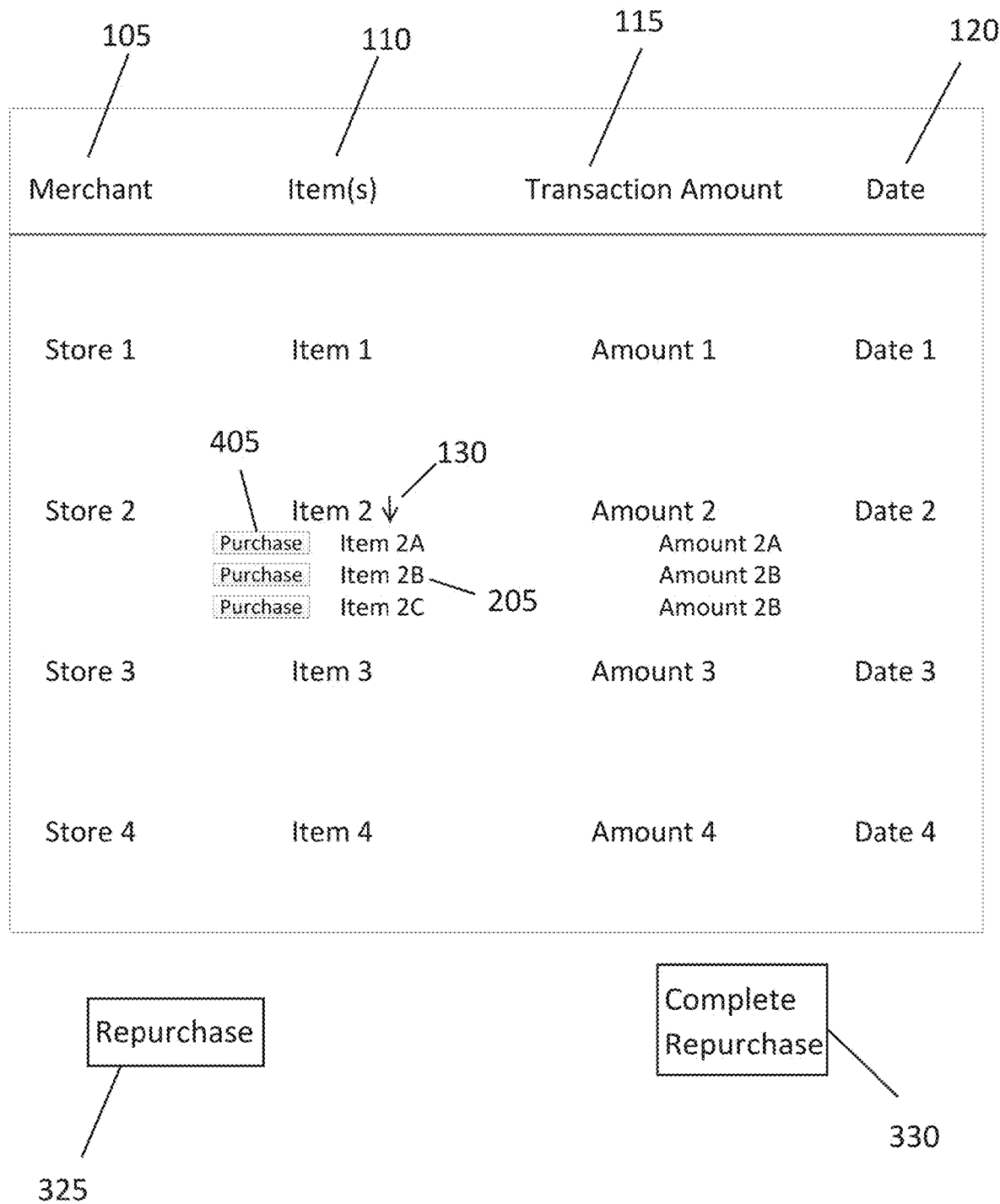
FIG. 4 is an exemplary diagram of a transaction history generated by a financial institution providing the ability to repurchase some or all of the individual items for a transaction according to an exemplary embodiment of the present disclosure.

FIG. 4 is an exemplary diagram of a transaction history generated by a financial institution providing the ability to repurchase some or all of the individual items for a transaction according to an exemplary embodiment of the present disclosure. As shown in FIG. 4, if there are multiple items in a single transaction, the consumer can expand the list of items to show the Item List 205 of all items. Multiple Purchase Buttons 405 can be provided for all items in Item List 205, where each item in Item List 205 can include an associated purchase button. The consumer can then select the Purchase Button 405 for the individual items they wish to repurchase. As discussed above, the exemplary system, method and computer-accessible medium, according to an exemplary embodiment of the present disclosure, can initiate the repurchase immediately upon selection of Purchase Button 405. Alternatively, the consumer can select multiple Purchase Buttons 405, and then select Complete Repurchase Button 330 once all items for repurchase have been selected. Additionally, a third protection layer can be provided, regardless of whether the user has selected Repurchase Buttons 305-320 or Repurchase Button 405, which can include a popup dialog box requiring the user to affirm the repurchase.

After one or more repurchases are made, the transaction history can be updated with this information. Thus, the transaction history, which can be for a specific pay period, can include transactions made using the consumer's credit card as well as repurchase transactions made through the exemplary user interface. Additionally, the consumer can sort or filter the transactions by transaction type. For example, the consumer can filter the transaction history such that only transactions made with the credit card, or only repurchase transactions, are displayed.

In order to repurchase an item, the exemplary system, method and computer-accessible medium can provide the merchant with information about the repurchased items. For example, the merchant can be provided with the specific item information (e.g., including the name of the item and/or a SKU for the item), as well as the number of items. The merchant can also be provided with shipping information, including an address to ship the item to (e.g., or an identification to ship the item to the address the item was previously shipped to) and the method of shipment (e.g., shipment duration such as ground, two-day, overnight, etc.). Since the repurchase is being made outside of a typical credit card transaction, the fees for the payment can be lower, and there may be no credit card processing fee, which can be a substantial cost to the merchant. If a credit card is not used for the repurchase, then the merchant can pass some of the saving of the credit card purchase fees to the financial institution as a referral fee. Additionally, a separate referral fee can be provided by the merchant regardless of whether a credit card is used (e.g., regardless of whether there are credit card transaction fees). Additionally, certain merchants can provide item discounts to consumers who purchase items through the transaction history, and special discounts can be displayed in the transaction history to entice users to repurchase items.

Once a repurchase is selected, the exemplary system, method and computer-accessible medium can immediately provide payment to the merchant (e.g., through a bank transfer or through credit card processing). However, if multiple repurchases by multiple consumers are made at a single merchant, then the exemplary system, method and computer-accessible medium can batch process the ordering and payment. For example, at the end of a specific time period (e.g., every hour, every day, etc.), the exemplary system, method and computer-accessible medium can determine if multiple repurchases have been made at a single merchant. The exemplary system, method and computer-accessible medium can then process those orders for the single merchant at a particular time, and provide payment and order information to the single merchant in bulk. The repurchase order processing, including payment, can be performed at slower times, where the exemplary system, method and computer-accessible medium can devote significant processing time to process all of the orders (e.g., at the end of the day when there is likely to be less processing needs).

Once the consumer initiates a repurchase, the exemplary system, method and computer-accessible medium can generate order information which can be sent directly to the merchant (e.g., using a secure messaging service, by performing an Application Program Interface call to the order site or database setup by the consumer for orders, or using any other suitable messaging system to provide the merchant with the order information). The order information can include each item to be repurchased, the amount to be paid for each item, and the biographical information about the consumer. The merchant can receive the order and process it through its normal processing system, which can include electronically generating its own order information and its own fulfillment information (e.g., the information needed by the merchant to identify the customer, identify the item(s) to be repurchased, including its location, and shipping information).

Since the exemplary system, method and computer-accessible medium can perform the repurchase without using a credit card, additional, more powerful, fraud prevention measures can be utilized. For example, the spend by the consumer can be automatically analyzed, using a machine learning procedure, to determine the consumer's likely spend. Various factors can be used in generating the machine learning procedure including, but not limited to, the consumer's past spending habits, other consumer spending habits, where the other consumers may have similar traits to the consumer (e.g., biographical information, income, etc.). If the repurchase falls within predicted spend determined by the machine learning procedure, then the repurchase can be initiated. If it does not fall within the predicted spend, then the repurchase can be denied. Other fraud measures can include requiring a multifactor authentication for the repurchase (e.g., sending the consumer a text message or push notification to confirm the repurchase).

Alternatively, since the consumer which is a customer at the financial institution is the one who initiates the repurchase, fewer fraud measures can be utilized. For example, since the user requires the account credentials in order to access the transaction history, which can be subject to multifactor authentication, a repurchase is more than likely less fraudulent than a credit card transaction, where the a thief can fairly easily obtain the credit card information for the consumer (e.g., through credit card skimming, pictures of the credit card, hacking a website, etc.). Additionally, since the repurchase is of an item that has already been purchased, it may be more likely to not be fraud since the consumer has already purchased the item, and the original transaction more than likely would have already been flagged as fraudulent if the was determined to be fraudulent by the consumer.

FIG. 5 is an exemplary diagram of a transaction history generated by a financial institution providing the ability to repurchase only some of the items in the transaction history according to an exemplary embodiment of the present disclosure. For example, as shown in FIG. 5, only Purchase Buttons 305 and 320 are available to the consumer. Thus, only items 1 and 4 are available for repurchase directly using the transaction history, and items 2 and 3 are not available for repurchase. Various suitable factors can be used to determine whether an item can be available for repurchase. For example, only items below certain threshold amount can be available for purchase. This threshold amount can be set by the consumer, the financial institution providing the transaction history, or by the merchant. Alternatively, certain merchants might not want to provide the ability to have items repurchased directly within the transaction history. In such an example, the financial institution may need to obtain permission from each merchant to provide the ability to have items repurchased. For example, when the consumer selects an item that is not available for repurchase, the financial institution can send a purchase request using a secure messaging system to the merchant. The merchant can then confirm or deny the purchase request. The purchase request can also include permission to repurchase other items in the future. Such permission can be set just for the specific item currently being repurchased, or for all items at the merchant. Various other suitable parameters can be used to determine whether an item is available for repurchase, including if the merchant still stocks the item, the consumer's credit history, the consumer's credit amount, how much credit the user has used, etc.

Once a purchase is initiated by the consumer, the money for the purchase can be sent to the merchant to pay for the item, minus any fee that may be charged by the financial institution. Various suitable methods can be used to send the money from the financial institution to the merchant. This can include, but is not limited to, wire transfers, automated clearing house transfers from the financial institution that is initiating the purchase to a financial institution associated with the merchant. In particular, upon the first repurchase with a specific merchant, financial information associated with the merchant (e.g., bank account), can be received from the merchant. This information can be used for the current repurchase and any future repurchases. If the financial information changes, then merchant can send a message to the financial institution notifying it of the change in its own financial information.

The exemplary system, method and computer-accessible medium, according to an exemplary embodiment of the present disclosure, can perform an automatic analysis of each item, including all items for a single transaction, and determine the likelihood that the item is one the consumer will want to repurchase. For example, consumable items, such as food, toiletries, etc. are items that a consumer will typically purchase over and over again. The exemplary system, method and computer-accessible medium can identify these items, and make them available for repurchase. However, certain items (e.g., electronics, computers, and items over a certain value) are not likely to be repurchased. Thus, the exemplary system, method and computer-accessible medium may not make these items available for repurchase. This can provide an additional layer of security, as certain items will not be made available for repurchase, which would prevent someone with unauthorized access to the transaction history from repurchasing an expensive item. As discussed below, the exemplary system, method and computer-accessible medium can utilize machine learning (E.g., using neural networks) to identify items for repurchase.

A typical credit card transaction can provide an extremely short period of time for the payment processor to determine if the transaction is fraudulent. Thus, given the amount of time, it can be difficult to prevent many types of fraud. In contrast, since the exemplary system, method and computer-accessible medium can batch process repurchases at a later time, the exemplary system, method and computer-accessible medium does not have the same time constraints as a typical credit card transaction, and various other suitable fraud detection procedures can be used. For example, the exemplary system, method and computer-accessible medium can analyze the entire transaction history of the user to determine the user's typical spend, and then determine if the new transactions being initiated are within this typical spend.

If a transaction looks suspicious, multifactor authentication can be performed in order to approve the transaction. For example, the consumer can be sent a notification (e.g., by text or email) of the pending transaction, with the option to approve or deny the transaction. Additionally, the consumer can be prompted for certain identifying information (e.g., mother's maiden name, card verification value ("cvv") number on the credit card, a separate transaction password, etc.) before a transaction for repurchase is approved and processed.

Additional purchase information can be used to determine whether a transaction is fraudulent. For example, if a consumer has already repurchased an item, then they may be more likely to repurchase the item again, indicating that the purchase isn't fraudulent. Additionally, the number of times the consumer has repurchased an item can be used to determine if the transaction is fraudulent, as well as the time between repurchases. For example, if a consumer has repurchased an item multiple times, but the time between repurchases is every six months, then it can be likely that a repurchase after only one month is fraudulent. In such a scenario, the exemplary multifactor authentication can be used to verify the repurchase, where the multifactor authentication may not be used if the repurchase keeps to the same schedule. Additionally, the frequency of repurchases from all consumers can be aggregated and used.

Various other suitable fraud prevention measure can be used by the exemplary system, method and computer-accessible medium. For example, the addresses for shipment of the repurchase can be limited to, for example, the address of the initial purchase, the address associated with the credit card or financial account, or a list of preloaded addresses provided by, and verified by, the consumer. Additionally, when being provided with the ability to select an address, the exemplary system, method and computer-accessible medium may only provide a nickname for the address (e.g., work or home) without providing the entire address. Thus, someone committing fraud would not be able to determine where the item was being shipped to.

In addition to fraud prevention measures, the exemplary system, method and computer-accessible medium can incorporate certain measures to prevent the consumer from incurring too much financial liability in a single transaction period. For example, when a repurchase request is made, the exemplary system, method and computer-accessible medium can determine whether or not the repurchase will put the consumer over their credit limit. If the purchase will put the consumer over their credit limit, then the exemplary system, method and computer-accessible medium can deny the repurchase, and notify the user the reason for the denial. If the repurchase will put the consumer above their credit limit, the user can be provided with a notification of a payment amount needed to put the consumer under the credit limit for the repurchase transaction to then be approved. If a repurchase is denied because of a credit limit, the exemplary system, method and computer-accessible medium can store information regarding that repurchase. When the consumer is again below their credit limit, the consumer can be provided with a notification that they can now repurchase the item. This can be at a future time once the consumer is back below their credit limit. Additionally, when a repurchase is denied because of a credit limit, the consumer can be provided with an option to automatically approve the repurchase once they are back below their credit limit. Thus, the user does not have to reinitiate the repurchase at a later date, as it will be performed automatically by the exemplary system, method and computer-accessible medium.

Additionally, the consumer can set up their own arbitrary credit limit that may be smaller than the credit limit allowed by the financial institution. When a repurchase request is made, the exemplary system, method and computer-accessible medium can perform a check against the consumer-set credit limit. If the repurchase will put the consumer above this credit limit, the consumer can be notified of the potential to exceed this limit, and be given the option to approve or deny the repurchase.

The consumer can also queue multiple repurchases to be performed at a later date based on various suitable criteria. For example, repurchases can be queued to take place once a consumer is below their credit limit. Alternatively, the repurchases can be queued to only take place on certain days of the month (e.g., after the consumer has been paid). Additionally, the consumer can link a bank account. The exemplary system, method and computer-accessible medium can monitor the bank account and automatically repurchase the queued items once a certain amount of money is detected in the bank account.

The exemplary system, method and computer-accessible medium can also notify the consumer of any fees that may be incurred by the repurchase. For example, if the consumer has an outstanding balance that is subject to interest, then the consumer can be notified of the potential financial impact (e.g., additional fees incurred) by repurchasing an item. This can include providing a pop-up notification to the consumer after the consumer presses the repurchase button.

When making purchases with certain credit cards, the consumer can be given rewards by the company that issued the credit card. Additionally, the merchant may have its own rewards program, and the consumer may receive rewards from the merchant. When making a repurchase through the transaction history, the consumer can be provided with the same rewards structure regardless of whether the credit card is used. Additionally, the rewards structure can be increased if a credit card is not used, since the incurred fees can be lower.

The exemplary system, method and computer-accessible medium, according to an exemplary embodiment of the present disclosure, can also be used to setup recurring payments, to facilitate a pseudo subscription service without having to sign up for the subscription. For example, in addition to automatic monthly service plans, many services (e.g., monthly music, or video services) have month to month service plans. This can be beneficial to the consumer as they don't have to worry about cancelling a service. However, a drawback to this type of setup is that every month the consumer has to go and pay the monthly fee, instead of the monthly fee being automatically charged. The exemplary system, method and computer-accessible medium can be setup to automatically provide monthly payments to a subscription service, subject to similar account settings described above, without having to sign up for a monthly subscription service. The exemplary system, method and computer-accessible medium can interface directly with the service, and provide the monthly payment to the service. The consumer can then access their transaction history, and sort or filter the history based on monthly payments to subscription services. The consumer can then stop these pseudo monthly subscription services right within the transaction history as described below.

For example, each month the user can access the transaction history and manually select all of the month to month services they wish to continue. This can be performed by simply marking each service transaction, and initiating a pay to all, which may be just a single service, within the transaction history. Alternatively, the exemplary system, method and computer-accessible medium can be setup to automatically pay all of the subscription services. The user can then mark each service that they do not want to pay for. The user can then initiate a do not pay command, and any service selected will not be paid. A combination of the above can also be incorporated, and some services can be setup for automatic monthly pay, which would require the user to manually stop the payment within the transaction history, and some services can be setup to require the user to manually select for payment.

In addition to monthly subscription services, the consumer can setup monthly repurchases. For example, if there is a repurchase that the consumer makes monthly (e.g., groceries, pet food, etc.), the consumer can setup up this monthly recurring repurchase right in the transaction history. The consumer can then stop monthly repurchases also within the transaction history.

Exemplary Machine Learning

As discussed above, the exemplary system, method and computer-accessible medium can utilize machine learning to determine which items are likely to be repurchased. These items can then be made available for repurchase. The exemplary machine learning can utilize information from multiple consumers to make the determination, and various exemplary models can be generated (e.g., for different types of users with different types of demographics, spending habits, credit limits etc.). The exemplary system, method and computer-accessible medium can then apply the generated models to existing or new consumers to identify which items to make available for repurchase. For example, the exemplary model can include information such as whether the consumer has repurchased an item before.

The exemplary system, method and computer-accessible medium can utilize various neural network, such as convolutional neural networks ("CNN") or recurrent neural networks ("RNN") to generate the exemplary models. A CNN can include one or more convolutional layers (e.g., often with a subsampling step) and then followed by one or more fully connected layers as in a standard multilayer neural network. CNNS can utilize local connections, and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

Figure 6:
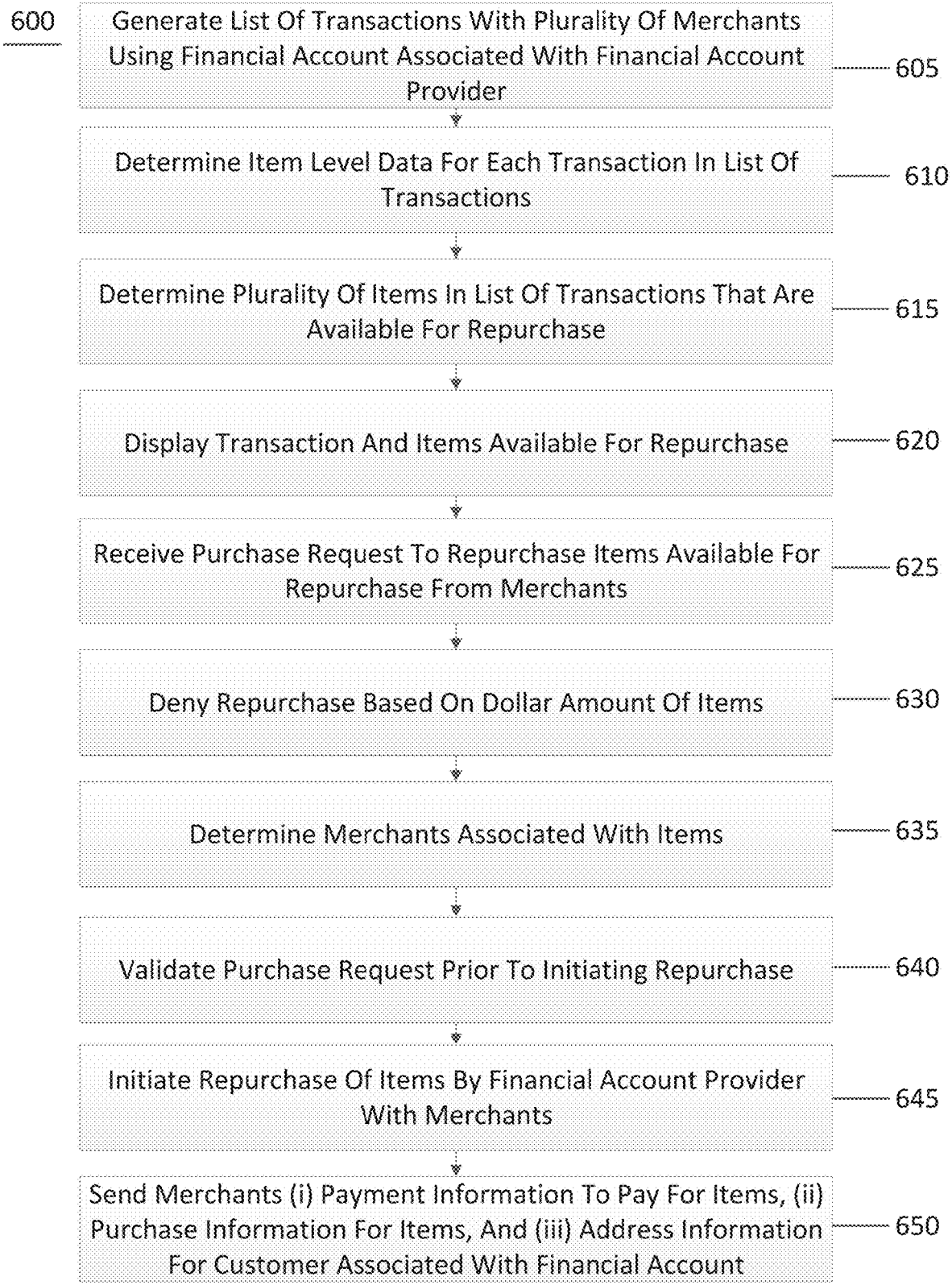
FIGS. 6 and 7 are exemplary flow diagrams of methods for initiating repurchases of items according to an exemplary embodiment of the present disclosure.

FIG. 6 is a flow diagram of a method 600 for batch processing a plurality of events according to an exemplary embodiment of the present disclosure. For example, at procedure 605, a list of transactions with a plurality of merchants using a financial account associated with a financial account provider can be determined. At procedure 610, item level data for each transaction in the list of transactions can be determined. At procedure 615, a plurality of items in the list of transactions that are available for repurchase can be determined. At procedure 620, the transaction and the items available for repurchase can be displayed. At procedure 625, a purchase request to repurchase one of the items available for repurchase from one of the merchants can be received. At procedure 630, the repurchase can be denied based on a dollar amount of the one of the items. At procedure 635, a merchant associated with the items can be determined. At procedure 640, the purchase request can be validated prior to initiating the repurchase. At procedure 645, a repurchase of the items by the financial account provider with the one of the merchants can be initiated. At procedure 650, the merchants can be sent (i) payment information to pay for the items, (ii) purchase information for the items, and (iii) address information for a customer associated with the financial account.

Figure 7:
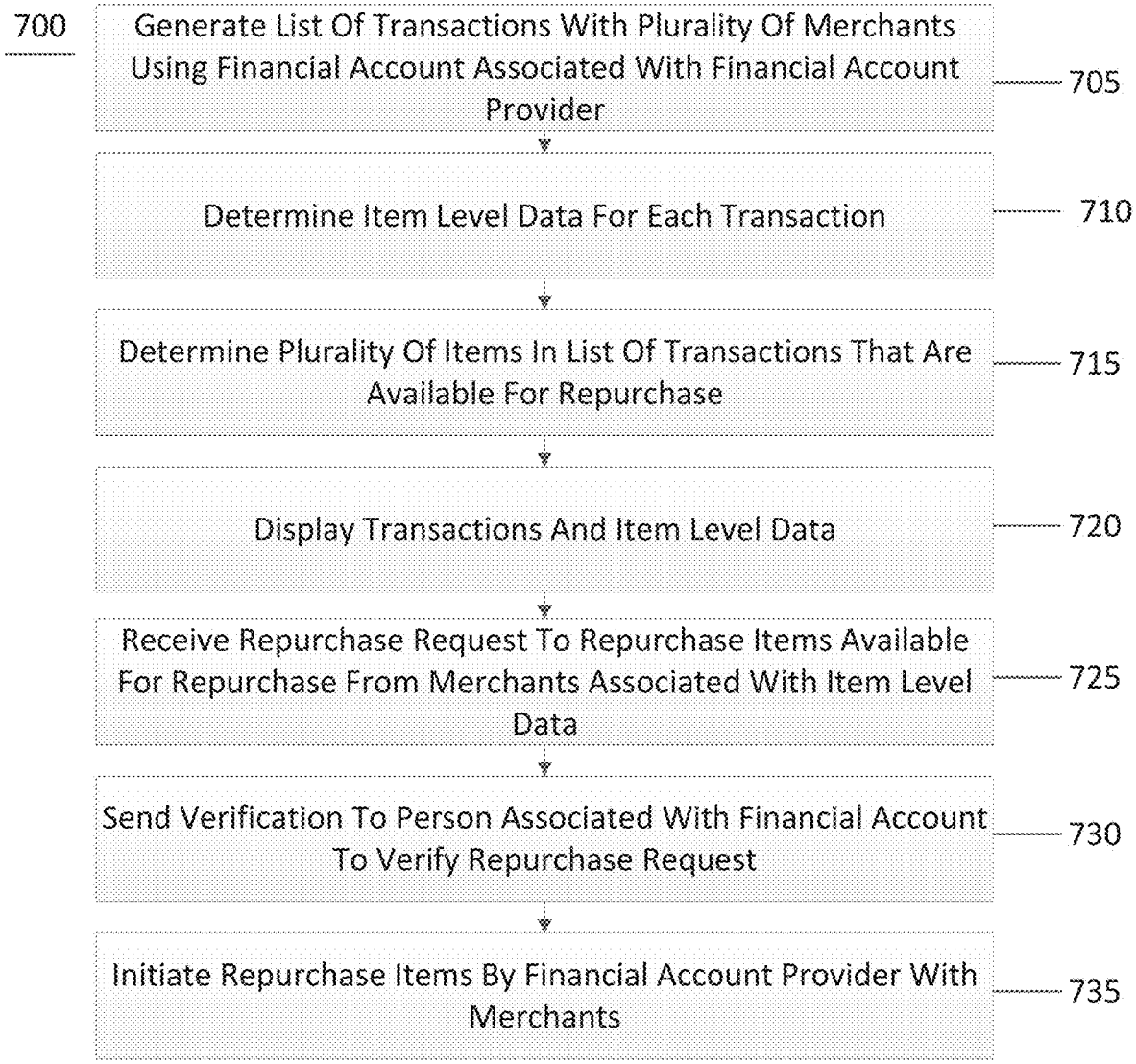

FIG. 7 is a flow diagram of a method 700 for batch processing a plurality of transactions according to an exemplary embodiment of the present disclosure. For example, at procedure 705, a list of transactions with a plurality of merchants using a financial account associated with a financial account provider can be generated. At procedure 710, item level data can be determined for each of the transactions. At procedure 715, a plurality of items in the list of transactions that are available for repurchase can be determined. At procedure 720, display the transaction and the item level data can be displayed. At procedure 725, a repurchase request to repurchase one of the items available for repurchase from one of the merchants associated with the item level data can be received. At procedure 730, a verification can be sent to a person associated with the financial account to verify the repurchase request. At procedure 735, a repurchase of the one of the items by the financial account provider with the one of the merchants can be initiated.

Figure 8:
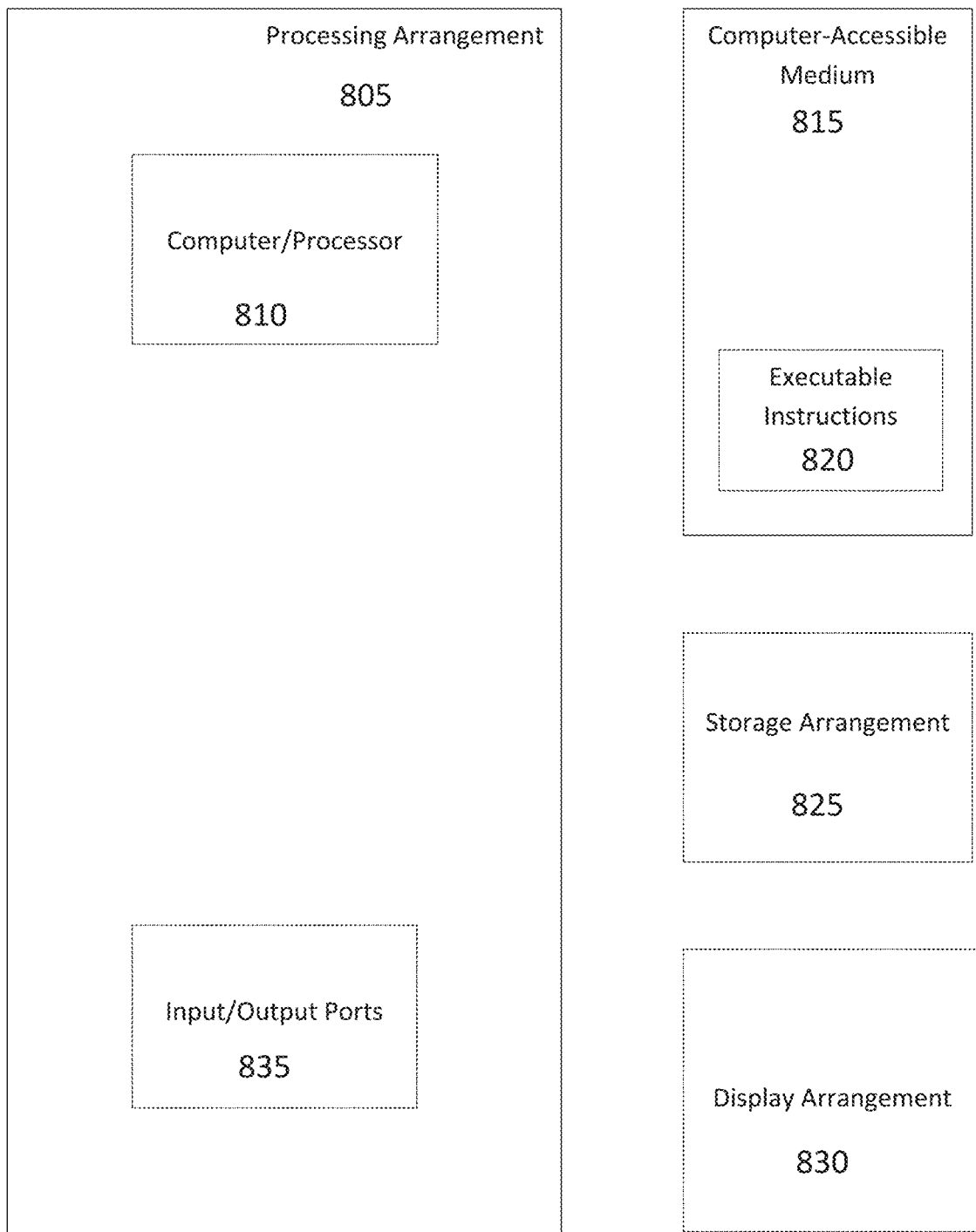
FIG. 8 is an illustration of an exemplary block diagram of an exemplary system in accordance with certain exemplary embodiments of the present disclosure.

FIG. 8 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 805. Such processing/computing arrangement 805 can be, for example entirely or a part of, or include, but not limited to, a computer/processor 810 that can include, for example one or more microprocessors, and use instructions stored on a computer-accessible medium (e.g., RAM, ROM, hard drive, or other storage device).

As shown in FIG. 8, for example a computer-accessible medium 815 (e.g., as described herein above, a storage device such as a hard disk, floppy disk, memory stick, CD-ROM, RAM, ROM, etc., or a collection thereof) can be provided (e.g., in communication with the processing arrangement 805). The computer-accessible medium 815 can contain executable instructions 820 thereon. In addition or alternatively, a storage arrangement 825 can be provided separately from the computer-accessible medium 815, which can provide the instructions to the processing arrangement 805 so as to configure the processing arrangement to execute certain exemplary procedures, processes, and methods, as described herein above, for example.

Further, the exemplary processing arrangement 805 can be provided with or include an input/output ports 835, which can include, for example a wired network, a wireless network, the internet, an intranet, a data collection probe, a sensor, etc. As shown in FIG. 8, the exemplary processing arrangement 805 can be in communication with an exemplary display arrangement 830, which, according to certain exemplary embodiments of the present disclosure, can be a touch-screen configured for inputting information to the processing arrangement in addition to outputting information from the processing arrangement, for example. Further, the exemplary display arrangement 830 and/or a storage arrangement 825 can be used to display and/or store data in a user-accessible format and/or user-readable format.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A method for implementing a modified financial account user interface to enable single-action re-purchase operations directly from a transaction history page associated with a financial account, the method comprising:
   selecting a plurality of transactions, associated with a plurality of merchants, from the transaction history page of the financial account, the financial account being associated with a financial account provider;
   determining item level data for each of the transactions selected from the transaction history page of the financial account, wherein a selected transaction comprises an expandable list of associated previously purchased transaction items;
   displaying each of the selected transactions, as an expandable list of associated transaction items with an active purchase button associated with each transaction item that is available for repurchase, wherein the active purchase button is displayed adjacent to a corresponding transaction item;

receiving a purchase request, based on a user interaction with the active purchase button associated with a selected transaction item, to repurchase the selected transaction item;

determining, using a machine learning procedure, a predicted spend for the financial account and whether the purchase request falls within the predicted spend;

in response to a determination that the purchase request is within the predicted spend, transmitting, upon receiving the purchase request, an authentication request to the user associated with the financial account;

receiving an authentication credential responsive to the authentication request;

initiating, upon receiving the authentication credential, a repurchase of the selected transaction item directly via the financial account provider of the financial account associated with the user; and updating, upon initiating the repurchase of the selected transaction item, the item level data for each of the transactions selected from the transaction history page of the financial account.

2. The method of claim 1, wherein the financial account is a credit card account.

3. The method of claim 1, wherein the items, from each of the selected transactions that are available for repurchase are identified by determining the item level data for each of the selected transactions.

4. The method of claim 1, wherein the repurchase is initiated by:
   determining at least one of the merchants associated with the selected transaction item; and
   sending to the at least one of the merchants (i) payment information to pay for the selected transaction item, (ii) purchase information for the selected transaction item, and (iii) address information for a customer associated with the financial account.

5. The method of claim 4, wherein the payment information excludes credit card information.

6. The method of claim 1, wherein the repurchase of the selected transaction item is a recurring purchase.

7. The method of claim 1, wherein the purchase request is validated prior to initiating the repurchase.

8. A system, comprising:
   (i) a computer configured to:
      (a) generate from a plurality of transactions recorded on a transaction history page of a financial account, a list of transactions with a plurality of merchants, the financial account being associated with a financial account provider;
      (b) determine a plurality of purchased items associated with each of the transactions in the list of transactions;
      (c) receive a purchase request, based on a user interaction with a selected transaction item, to repurchase the selected transaction item;
      (d) determine, using a machine learning procedure, a predicted spend for the financial account and whether the purchase request falls within the predicted spend;
      (e) in response to a determination that the purchase request is within the predicted spend, transmit, upon receiving the purchase request, an authentication request to the user associated with the financial account;
      (f) receive an authentication credential responsive to the authentication request;
      (g) initiate, upon receiving the authentication credential, a repurchase of the selected transaction item directly via the financial account provider of the financial account associated with the user;
      (h) update, upon initiating the repurchase of the selected transaction item, the item level data for each transaction selected from the transaction history page of the financial account; and
   (ii) a user interface device, for displaying financial account data to the user, configured to display:
      (a) the list of the transactions from the plurality of transactions recorded on the transaction history page of the financial account, wherein each transaction, is displayed, upon receiving a user action, as an expandable list of associated previously purchased transaction items;
      (b) an active purchase button adjacent each of the associated transaction items that are available for repurchase, wherein each active purchase button is selectable to initiate a repurchase of the corresponding transaction item.

9. The system of claim 8, wherein the financial account is a credit card account.

10. The system of claim 8, wherein the system is configured to determine the purchased items by determining the item level data for each transaction in the list of transactions.

11. The system of claim 8, wherein the system is further configured to initiate the repurchase of the selected transaction item:
   determining a particular one of the merchants associated with the selected transaction item; and
   sending to the particular one of the merchants (i) payment information to pay for the selected transaction item, (ii) purchase information for the selected transaction item, and (iii) address information for a customer associated with the financial account.

12. The system of claim 11, wherein the payment information excludes credit card information.

13. The system of claim 11, wherein the repurchase of the selected transaction item is a recurring purchase.

14. The system of claim 11, wherein the system is further configured to validate a purchase request prior to initiating the repurchase.

15. A non-transitory computer-accessible medium having stored thereon computer-executable instructions, wherein, when a computer executes the instructions, the computer is configured to perform procedures comprising:
   selecting a plurality of transactions, associated with a plurality of merchants, from a transaction history page of the financial account, the financial account being associated with a financial account provider;
   determining item level data for each of the transactions selected from the transaction history page of the financial account, wherein a selected transaction comprises an expandable list of associated previously purchased transaction items;
   displaying each of the selected transactions, as an expandable list of associated transaction items with an active purchase button associated with each transaction item that is available for repurchase, wherein the active purchase button is displayed adjacent to a corresponding transaction item;
   receiving a purchase request, based on a user interaction with the active purchase button associated with a selected transaction item, to repurchase the selected transaction item;

determining, using a machine learning procedure, a predicted spend for the financial account and whether the purchase request falls within the predicted spend;

in response to a determination that the purchase request is within the predicted spend, transmitting, upon receiving the purchase request, an authentication request to the user associated with the financial account;

receiving an authentication credential responsive to the authentication request;

initiating a repurchase of the selected transaction item directly via the financial account provider of the financial account associated with the user; and updating, upon initiating the repurchase of the selected transaction item, the item level data for each of the transactions selected from the transaction history page of the financial account.

\* \* \* \* \*